US011955704B2

(12) United States Patent
Huh et al.

(10) Patent No.: US 11,955,704 B2
(45) Date of Patent: Apr. 9, 2024

(54) ANTENNA DEVICE AND DISPLAY DEVICE INCLUDING THE SAME

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Yoon Ho Huh, Seoul (KR); Jong Min Kim, Gyeonggi-do (KR); Han Sub Ryu, Gyeongsangbuk-do (KR); Won Bin Hong, Seoul (KR)

(73) Assignees: DONGWOO FINE-CHEM CO., LTD., Jeollabuk-do (KR); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 296 days.

(21) Appl. No.: 17/492,903

(22) Filed: Oct. 4, 2021

(65) Prior Publication Data

US 2022/0029280 A1 Jan. 27, 2022

Related U.S. Application Data

(63) Continuation of application No. PCT/KR2020/004487, filed on Apr. 2, 2020.

(30) Foreign Application Priority Data

Apr. 4, 2019 (KR) ........................ 10-2019-0039637

(51) Int. Cl.
*H01Q 1/38* (2006.01)
*H01Q 1/44* (2006.01)

(52) U.S. Cl.
CPC ................ *H01Q 1/38* (2013.01); *H01Q 1/44* (2013.01)

(58) Field of Classification Search
CPC ........... H01Q 1/38; H01Q 1/44; H01Q 1/364; H01Q 1/523; H01Q 19/005; H01Q 21/08; H01Q 1/22
See application file for complete search history.

(56) References Cited

U.S. PATENT DOCUMENTS

2005/0046523 A1 3/2005 Wu et al.
2014/0313096 A1 10/2014 Baek et al.
(Continued)

FOREIGN PATENT DOCUMENTS

CN 105470626 A 4/2016
KR 10-2013-0020563 A 2/2013
(Continued)

OTHER PUBLICATIONS

English translation of KR-101962820-B1, Mar. 27, 2019, 8 pages (Year: 2019).*
(Continued)

*Primary Examiner* — Daniel D Chang
(74) *Attorney, Agent, or Firm* — The PL Law Group, PLLC

(57) ABSTRACT

An antenna device according to an embodiment of the present invention includes a dielectric layer, an antenna unit disposed on a top surface of the dielectric layer, the antenna unit including a radiator and a transmission line connected to the radiator, a dummy electrode separated from the antenna unit on the top surface of the dielectric layer, the dummy electrode at least partially surrounding the antenna unit, and a blocking pattern arranged around the antenna unit
(Continued)

in the dummy electrode. Radiation interruption from the dummy electrode is prevented by the blocking pattern to improve radiation reliability.

15 Claims, 4 Drawing Sheets

(56) References Cited

U.S. PATENT DOCUMENTS

| | | | | |
|---|---|---|---|---|
| 2016/0188092 | A1 | 6/2016 | Sebastian et al. | |
| 2022/0029278 | A1* | 1/2022 | Ryu .......................... | G09F 9/00 |

FOREIGN PATENT DOCUMENTS

| | | | |
|---|---|---|---|
| KR | 10-2013-0095451 | A | 8/2013 |
| KR | 10-2014-0126204 | A | 10/2014 |
| KR | 10-2015-0104509 | A | 9/2015 |
| KR | 10-1962820 | B1 | 3/2019 |

OTHER PUBLICATIONS

English translation of KR-20140126204-A, Oct. 30, 2014, 7 pages (Year: 2014).*

International Search Report for PCT/KR2020/004487 dated Jul. 8, 2020.

* cited by examiner

ANTENNA DEVICE AND DISPLAY DEVICE INCLUDING THE SAME

CROSS REFERENCE TO RELATED APPLICATIONS AND CLAIM OF PRIORITY

The present application is a continuation application to International Application No. PCT/KR2020/004487 with an International Filing Date of Apr. 2, 2020, which claims the benefit of Korean Patent Application No. 10-2019-0039637 filed on Apr. 4, 2019 at the Korean Intellectual Property Office, the disclosures of which are incorporated by reference herein in their entirety.

BACKGROUND

1. Field

The present invention relates to an antenna device and a display device including the same. More particularly, the present invention relates to an antenna device including an electrode pattern and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as thin-type, high-transparency and high-resolution display devices such as a transparent display and a flexible display are recently developed, the antenna is also developed in the form of, e.g., a film or patch including a thin film electrode.

The antenna includes a radiation electrode, and the radiation electrode may be formed as, e.g., a mesh shape to improve a transparency of the antenna. In this case, the radiation electrodes include electrode lines crossing each other, and the electrode lines may be visually recognized by a user of the image display device.

When electrodes similar to the mesh pattern are arranged around the radiation electrode to prevent the visual recognition of the electrode lines, power and radiation through the radiation electrode may be disturbed or reduced.

For example, Korean Published Patent Application No. 2013-0095451 discloses an antenna integrated into a display panel, but does not consider the visual recognition of electrodes included in the antenna and radiation efficiency.

SUMMARY

According to an aspect of the present invention, there is provided an antenna device having improved visual property and radiation reliability.

According to an aspect of the present invention, there is provided a display device including an antenna device with improved visual property and radiation reliability.

The above aspects of the present invention will be achieved by the following features or constructions:

(1) An antenna device, including: a dielectric layer; an antenna unit disposed on a top surface of the dielectric layer, the antenna unit including a radiator and a transmission line connected to the radiator; a dummy electrode separated from the antenna unit on the top surface of the dielectric layer, the dummy electrode at least partially surrounding the antenna unit; and a blocking pattern arranged around the antenna unit in the dummy electrode.

(2) The antenna device of the above (1), wherein each of the antenna unit and the dummy electrode includes a mesh structure.

(3) The antenna device of the above (2), wherein the blocking pattern includes a mesh structure the same as the mesh structure included in the dummy electrode.

(4) The antenna device of the above (1), wherein the blocking pattern has an island shape separated in the dummy electrode.

(5) The antenna device of the above (4), wherein a plurality of the blocking patterns are arranged along a perimeter of the antenna unit.

(6) The antenna device of the above (1), wherein a plurality of the radiators are arranged on the top surface of the dielectric layer.

(7) The antenna device of the above (6), further including a pad electrode independently provided for each of the radiators.

(8) The antenna device of the above (6), wherein the radiators include a first radiator and a second radiator adjacent to each other, and the first radiator and the second radiator are coupled by the transmission line to form a radiator group.

(9) The antenna device of the above (8), wherein the blocking pattern is disposed between the first radiator and the second radiator.

(10) The antenna device of the above (8), wherein a plurality of the radiator groups are arranged on the top surface of the dielectric layer.

(11) The antenna device of the above (10), further including a pad electrode independently provided for each of the radiator groups.

(12) The antenna device of the above (1), further including a ground layer disposed on a bottom surface of the dielectric layer.

(13) The antenna device of the above (1), wherein a ratio of an area of the blocking pattern relative to an area of the radiator is from 0.4 to 0.85.

(14) The antenna device of the above (1), wherein a spacing distance between the radiator and the dummy electrode is from 2 to 10 μm.

(15) The antenna device of the above (1), wherein the antenna unit, the dummy electrode and the blocking pattern include at least one selected from the group consisting of silver (Ag), gold (Au), copper (Cu), aluminum (Al), platinum (Pt), palladium (Pd), chromium (Cr)), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) and an alloy thereof.

(16) A display device comprising the antenna device according to embodiments as described above.

An antenna device according to embodiments of the present invention may include a radiator including a mesh structure and a dummy electrode including a mesh structure around the radiator. The radiator and the dummy electrode may be formed as a similar pattern to improve an electrode pattern uniformity to prevent electrodes from being recognized by a user.

In exemplary embodiments, an island-shaped blocking pattern may be included in the dummy electrode. Radiation absorption into the dummy electrode and generation of a fringing field may be blocked by the blocking pattern.

Therefore, enhanced optical properties may be implemented while maintaining a gain and a directivity of the antenna device.

DETAILED DESCRIPTION OF THE EMBODIMENTS

According to exemplary embodiments of the present invention, there is provided an antenna device including a radiator and a dummy electrode, and having an improved radiation reliability by utilizing a blocking pattern formed in the dummy electrode.

The antenna device may be, e.g., a microstrip patch antenna fabricated in the form of a transparent film. The antenna device may be applied to communication devices for a mobile communication of a high or ultrahigh frequency band (e.g., 3G, 4G, 5G or more)

According to exemplary embodiments of the present invention, there is also provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
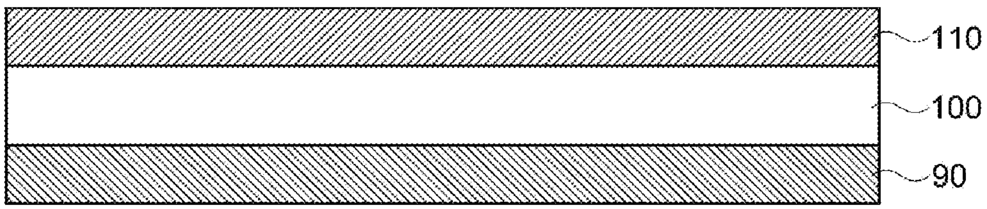
FIGS. 1 and 2 are a schematic cross-sectional view and a top planar view, respectively, illustrating an antenna device in accordance with exemplary embodiments.
Figure 2:
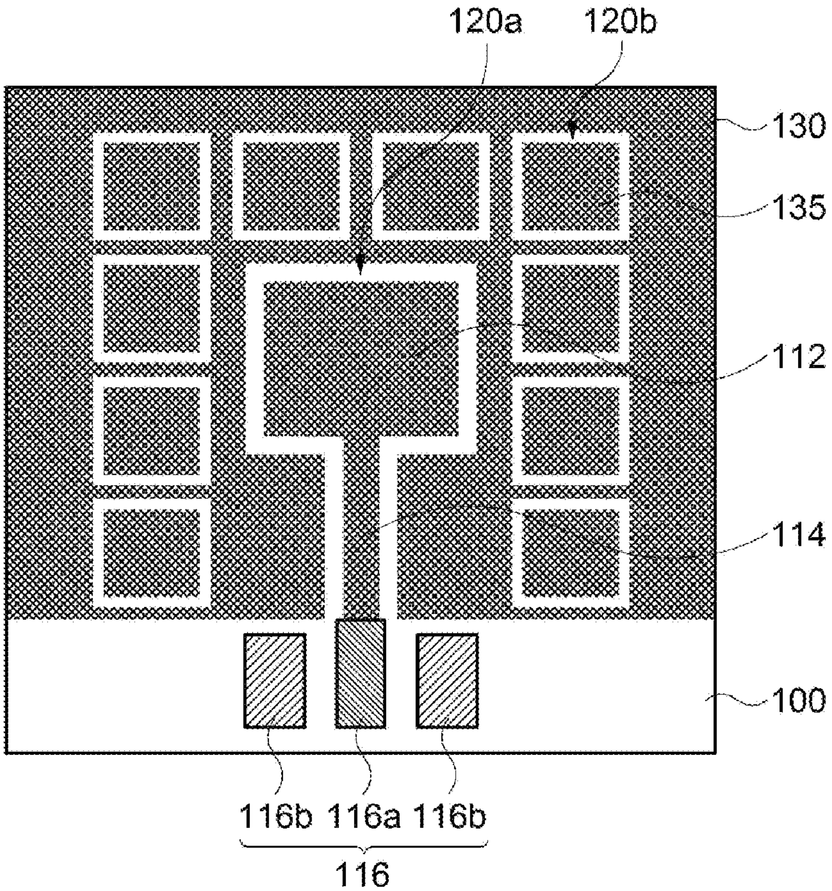

FIGS. 1 and 2 are a schematic cross-sectional view and a top planar view, respectively, illustrating an antenna device in accordance with exemplary embodiments.

Referring to FIGS. 1 and 2, the antenna device according to exemplary embodiments may include a dielectric layer 100, a first electrode layer 110 disposed on a top surface of the dielectric layer 100 and a second electrode layer 90 disposed on a bottom surface of the dielectric layer 100.

The dielectric layer 100 may include an insulating material having a predetermined dielectric constant. The dielectric layer 100 may include, e.g., an inorganic insulating material such as glass, silicon oxide, silicon nitride or a metal oxide, or an organic insulating material such as an epoxy resin, an acrylic resin or an imide-based resin. The dielectric layer 100 may serve as a film substrate of the antenna device on which the first electrode layer 110 is formed.

For example, a transparent film may serve as the dielectric layer 90. For example, the transparent film may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth) acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 100.

In some embodiments, a dielectric constant of the dielectric layer 100 may be adjusted in a range from about 1.5 to about 12. When the dielectric constant exceeds about 12, a driving frequency may be excessively decreased and a driving in a desired high frequency band may not be implemented.

As illustrated in FIG. 2, the first electrode layer 110 may include an antenna unit including a radiator 112 and a feeding line 114.

In some embodiments, the first electrode layer 110 may further include a dummy electrode 130 arranged around the antenna unit.

In exemplary embodiments, the first electrode layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals. These may be used alone or in combination therefrom.

In an embodiment, the first electrode layer 110 may include silver (Ag) or a silver alloy to implement a low resistance, and may include, e.g., a silver-palladium-copper (APC) alloy.

In an embodiment, the first electrode layer 110 may include copper (Cu) or a copper alloy to implement a low resistance and a fine line width pattern. For example, the first electrode layer 110 may include a copper-calcium (Cu—Ca) alloy.

In some embodiments, the first electrode layer 110 may include a transparent conductive oxide such as indium tin oxide (ITO), indium zinc oxide (IZO), indium zinc tin oxide (ITZO), zinc oxide (ZnOx), etc.

For example, the first electrode layer 110 may have a multi-layered structure including at least one metal or alloy layer and a transparent conductive oxide layer. For example, the first electrode layer 110 may have a double-layered structure of the transparent conductive oxide layer-the metal layer, or a triple-layered structure of a first transparent conductive oxide layer-the metal layer-a second transparent conductive oxide layer.

In exemplary embodiments, the antenna unit or a radiator 112 may include a mesh structure (a first mesh structure).

Accordingly, transmittance of the radiator 112 may be increased, and flexibility of the antenna device may be improved. Accordingly, the antenna device may be effectively applied to a flexible display device.

The dummy electrode 130 may also include a mesh structure (a second mesh structure). In some embodiments, the first mesh structure and the second mesh structure may have the same structure. For example, a line width and a spacing (a pitch) of electrode lines included in the first mesh structure and the second mesh structure may be substantially the same.

In an embodiment, the first mesh structure and the second mesh structure may be different from each other.

The transmission line 114 may extend from one end portion of the radiator 112. For example, the transmission line 114 may protrude and extend from a central portion of the radiator 112.

In an embodiment, the transmission line 114 may include substantially the same conductive material as that of the radiator 112 and may be formed through substantially the same etching process. In this case, the transmission line 114 may be integrally connected to the radiator 112 to be provide as a substantially single member.

In some embodiments, the transmission line 114 and the radiator 112 may include substantially the same mesh structure (the first mesh structure). The dummy electrode 130 including the second mesh structure may be spaced apart from the radiator 112 and the transmission line 114 by a predetermined distance, and may be formed along a perimeter of the radiator 112 and the transmission line 114.

In an embodiment, the conductive layer including the above-described metal, alloy, and/or transparent conductive oxide may be formed on the dielectric layer 100, and then the conductive layer may be etched to form a mesh layer. While forming the mesh layer, the conductive layer may be etched along profiles of the radiator 112 and the transmission line 114 to form a first separation region 120*a*. The antenna unit including the radiator 112 and the transmission line 114, and the dummy electrode 130 may be separated from the mesh layer by the first separation region 120*a*.

In some embodiments, a spacing distance between the antenna unit and the dummy electrode 130 (e.g., a width of the first separation region 120*a*) may be about 2 to 10 μm. In the above range, a signal interference caused by the dummy electrode 130 may be reduced while preventing a visual recognition of electrodes.

In an embodiment, the electrode line included in the antenna unit and the dummy electrode 130 to form a mesh structure may have a line width of about 2 to 10 μm and a thickness of about 100 to 5,000 Å. In the above range, a transmittance of the antenna device may be improved while lowering a resistance of the antenna unit.

In exemplary embodiments, the dummy electrode 130 may include a blocking pattern 135. The blocking pattern 135 may share the second mesh structure included in the dummy electrode 130.

The blocking pattern 135 may have an island shape isolated in the dummy electrode 130. For example, a second separation region 120*b* may be formed by etching a portion of the mesh layer included in the dummy electrode 130 along a profile of the blocking pattern 135. An island-shaped blocking pattern 135 may be defined by the second separation region 120*b*.

In exemplary embodiments, a plurality of the blocking patterns 135 may be arranged along the perimeter of the radiator 112. In some embodiments, as illustrated in FIG. 2, a blocking pattern 135 may also be disposed around the transmission line 114.

The blocking pattern 135 may block an induced current and a self-radiation generated in the dummy electrode 130 caused by a fringing field directed from the radiator 112 to the dummy electrode 130. For example, the blocking pattern 135 may serve as a bandpass filter or an LC element to block the radiation absorption and induced current in the dummy electrode 130.

Accordingly, a radiation concentration at the radiator 112 may be increased, and gain and directivity of the antenna device may also be improved.

In some embodiments, a ratio of an area of each blocking pattern 135 relative to an area of the radiator 112 may be in a range from about 0.4 to 0.85. Within the above range, high-frequency or ultra-high frequency communication properties corresponding to, e.g., 3G, 4G, 5G or higher bands may be substantially implemented while providing the filtering through the blocking pattern 135.

A pad electrode 116 may be disposed at one end portion of the antenna device. In some embodiments, the pad electrode 116 may include a signal pad 116*a* and a ground pad 116*b*. The signal pad 116*a* may be electrically connected to the radiator 112 by the transmission line 114, and may electrically connect a driving circuit unit (e.g., an IC chip) to the radiator 112.

For example, a circuit board such as a flexible circuit board (FPCB) may be bonded to the signal pad 116*a*, and the driving circuit unit may be disposed on the flexible circuit board. Accordingly, signal transmission/reception may be implemented between the antenna unit and the driving circuit unit. In an embodiment, the driving circuit unit may be directly mounted on the surface of the flexible circuit board.

In some embodiments, a pair of the ground pads 116*b* may be disposed to face each other while being electrically and physically spaced apart from the signal pad 116*a* with the signal pad 116*a* interposed therebetween. Accordingly, a horizontal radiation may be implemented together with a vertical radiation through the antenna device.

The pad electrode 116 may have a solid structure including the above-described metal or alloy to reduce a signal resistance. The pad electrode 116 may be located at the same layer as that of the antenna unit (e.g., on the top surface of the dielectric layer 100).

Alternatively, the pad electrode 116 may be located at a different layer from that of the antenna unit. For example, an insulating layer covering the antenna unit may be formed, and a pad electrode 116 may be formed on the insulating layer. In this case, the signal pad 116*a* may be electrically connected to the transmission line 114 through a contact penetrating the insulating layer.

The second electrode layer 90 may serve as a ground electrode or a ground layer of the antenna unit. For example, a capacitance or an inductance may be formed in a thickness direction of the antenna device between the radiator 112 and the second electrode layer 90 by the dielectric layer 100 so that a frequency band at which the antenna unit may be driven may be adjusted. For example, the antenna device may be provided as a vertical radiation antenna by the second electrode layer 90.

The second electrode layer 90 may include a metal substantially the same as or similar to that of the first electrode layer 110. In an embodiment, a conductive member of a display device on which the antenna device is mounted may serve as the second electrode layer 90.

The conductive member may include, e.g., various wirings such as a gate electrode, a scan line or a data line of a thin film transistor (TFT) included in the display panel, or various electrodes such as a pixel electrode and a common electrode.

As described above, the transmittance of the antenna device may be improved by forming the antenna unit to include the first mesh structure. Further, the dummy electrode 130 including the second mesh structure and the blocking pattern 135 therein may be arranged around the antenna unit. Accordingly, while blocking the self-radiation and induced current by the dummy electrode 130, the antenna unit may be prevented from being visually recognized due to a locational electrode arrangement deviation.

Figure 3:
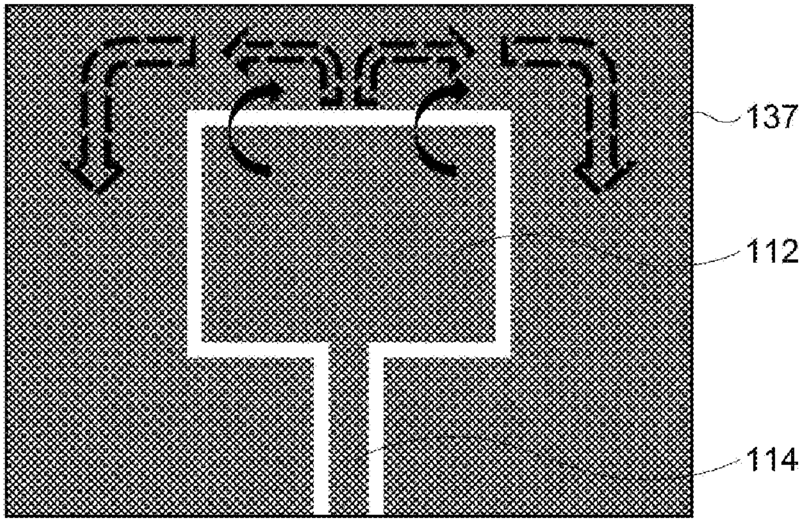
FIG. 3 is a schematic top planar view for explaining a radiation property in an antenna device according to a comparative example.

FIG. 3 is a schematic top planar view for explaining a radiation property in an antenna device according to a comparative example.

Referring to FIG. 3, in the comparative example, a dummy electrode 137 from which a member serving as a filter such as the blocking pattern 135 according to an embodiment of the present invention is omitted may be formed around the radiator 112.

In this case, a fringing field may be generated from the radiator 112 to the dummy electrode 137 as indicated by a black bold arrow. Accordingly, as indicated by the dotted arrow, an induced current by the fringing field may be generated in the dummy electrode 137.

A self-radiation may occur within the dummy electrode 137 by the induced current, and a radiation interference with the radiator 112 may occur to cause a deterioration of gain and directivity, an impedance mismatch, etc.

However, according to the above-described exemplary embodiments, the blocking pattern 135 may block or filter the fringing field directed to the dummy electrode 130. Accordingly, a field concentration between the radiator 112 and the second electrode layer 90 may be improved, and radiation reliability and gain properties may be improved.

Figure 4:
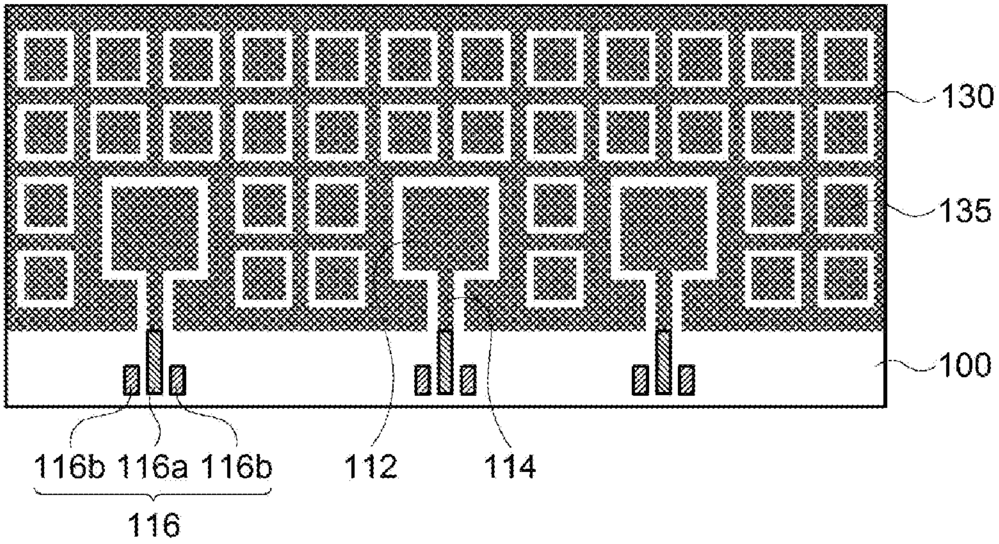
FIG. 4 is a schematic top planar view illustrating an antenna device in accordance with some exemplary embodiments.

FIG. 4 is a schematic top planar view illustrating an antenna device in accordance with some exemplary embodiments.

Referring to FIG. 4, a plurality of antenna units including the radiator 112 and a transmission line 114 may be arranged in an array form. For example, the antenna units may be regularly arranged in a row direction. The pad electrode 116 may be provided for each antenna unit, and a feeding and an antenna driving control may be independently performed for each antenna unit through the signal pad 116*a*.

The blocking patterns 135 may be arranged along the perimeter of each antenna unit. In some embodiments, the blocking patterns 135 may be distributed over substantially an entire area of the dummy electrode 130. Accordingly, the self-radiation of the dummy electrode 130 may be blocked even in a region relatively far from the radiator 112, thereby improving the radiation reliability and efficiency of the radiator 112.

Figure 5:
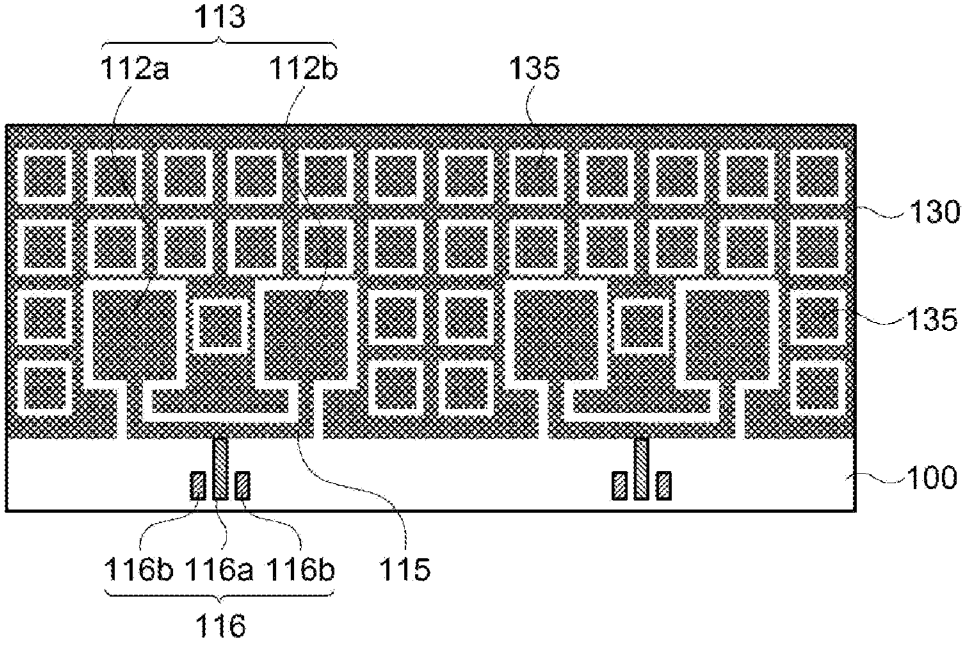
FIG. 5 is a schematic top planar view illustrating an antenna device in accordance with some exemplary embodiments.

FIG. 5 is a schematic top planar view illustrating an antenna device in accordance with some exemplary embodiments.

Referring to FIG. 5, adjacent radiators may be coupled to form a radiator group 113.

For example, a first radiator 112*a* and a second radiator 112*b* neighboring each other may be coupled through the transmission line 114 to form the radiator group 113. The pad electrode 116 may be provided for each radiator group 113 so that an independent feeding and control may be performed.

Accordingly, a plurality of the radiators may form a group so that independent antenna driving may be implemented for each radiator group 113 while amplifying a gain amount through the radiator.

The blocking patterns 135 may be arranged along a perimeter of the radiator group 113. Further, the blocking pattern 135 may be disposed between the first radiator 112*a* and the second radiator 112*b* included in the radiator group 113. Accordingly, an induced current and self-radiation generated in a portion of the dummy electrode 130 between the first radiator 112*a* and the second radiator 112*b* may be blocked.

Figure 6:
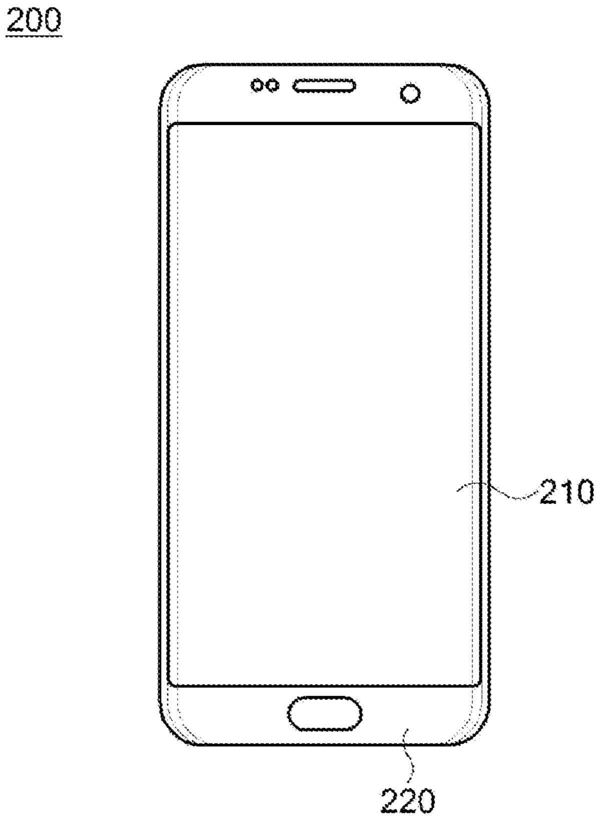
FIG. 6 is a schematic top planar view illustrating a display device in accordance with exemplary embodiments.

FIG. 6 is a schematic top planar view illustrating a display device in accordance with exemplary embodiments. For example, FIG. 6 illustrates an external shape including a window of a display device.

Referring to FIG. 6, a display device 200 may include a display area 210 and a peripheral area 220. The peripheral area 220 may be disposed at both lateral portions and/or both end portions of the display area 210.

In some embodiments, the above-described antenna device may be inserted into the peripheral area 220 of the display device 200 in the form of a patch or a film. In some embodiments, the radiator 112 of the above-described film antenna is disposed to at least partially correspond to the display area 210 of the display device 200, and the pad electrode 116 of the display device 200 may be disposed to correspond to the peripheral area 220.

The peripheral area 220 may correspond to, e.g., a light-shielding portion or a bezel portion of the image display device. Further, a driving circuit such as an IC chip of the display device 200 and/or the antenna device may be disposed in the peripheral area 220.

The pad electrode 116 of the antenna device may be adjacent to the driving circuit, so that a signal transmission/reception path may be shortened and a signal loss may be suppressed.

In some embodiments, the dummy electrode 130 of the antenna device may be disposed in the display area 210. The second electrode layer 90 of the antenna device may also be disposed in the display area 210. The dummy electrode 130 may be added so that the visual recognition of the electrode lines included in the antenna unit may be prevented, and the blocking pattern 135 may be distributed within the dummy electrode 130 to suppress a radiation interference caused by the dummy electrode 130. Additionally, operation reliability in a display panel included in the display device 200 may also be improved by suppressing the induced current in the dummy electrode 130.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE

A first electrode layer and a second electrode layer having a mesh structure were formed on upper and lower surfaces of a glass (0.7T) dielectric layer, respectively, using an alloy (APC) of silver (Ag), palladium (Pd) and copper (Cu). A line width of an electrode line included in the mesh structure was 3 μm, and an electrode thickness (or height) was 2,000 Å.

The first electrode layer was etched to form a first separation region (width 3 μm) to form a dummy electrode and a radiator. A size of the radiator was 1.86 mm×2.17 mm (4.03 $mm^2$).

The dummy electrode was partially etched to form a second separation region to form blocking patterns around the radiator. Antenna device samples were prepared while changing a size (area) of each blocking pattern.

COMPARATIVE EXAMPLE

An antenna device sample was prepared by the same method as that in Example except that the blocking pattern formation in the dummy electrode was omitted.

Experimental Example (1) Evaluation of Antenna Driving Property

A feeding was supplied to each antenna device sample of Examples and Comparative Examples, and S-parameter (S21) and resonance frequency were measured using Vector Network Analyzer (Manufacturer: Anritsu, Model Name: MS4644B). Specifically, a measurement port was connected to each of the radiator and the blocking pattern (the dummy electrode in the case of Comparative Example), and a ratio by which the current supplied to the radiator was transferred or absorbed into the blocking pattern (or the dummy electrode) was calculated by the following Equation 1 was evaluated.

$$S21\ (\text{dB}) = -10\log[(\text{power in the blocking pattern or the dummy electrode})/(\text{power input to the radiator})] \quad \text{[Equation 1]}$$

The evaluation results are shown in Table 1 below.

TABLE 1

| | Area of Blocking pattern ($mm^2$) | Area Ratio (area of blocking pattern/ area of radiator) | Resonance Frequency (GHz) | S21(dB) |
|---|---|---|---|---|
| Example 1 | 1.0 | 0.25 | 38.61 | 26.11 |
| Example 2 | 1.4 | 0.36 | 36.24 | 24.10 |
| Example 3 | 2.0 | 0.49 | 33.58 | 21.97 |
| Example 4 | 2.6 | 0.63 | 29.92 | 18.50 |
| Example 5 | 3.2 | 0.80 | 26.66 | 16.08 |
| Example 6 | 3.5 | 0.87 | 25.13 | 14.67 |
| Example 7 | 4.0 | 0.99 | 22.43 | 12.38 |
| Comparative Example | — | — | 28.35 | 3.59 |

Referring to Table 1, when the blocking pattern was included in the dummy electrode, the radiation loss was remarkably reduced.

In Comparative Example, the current supplied to the radiator was excessively absorbed by the dummy electrode, and the radiation loss was remarkably increased.

In Examples 3 to 5, driving properties in which the radiation loss in the dummy electrode or the blocking pattern was suppressed was implemented in. e.g., a frequency range of 5G band (about 26 to 35 GHz),

What is claimed is:

1. An antenna device, comprising:

a dielectric layer;

an antenna unit disposed on a top surface of the dielectric layer, the antenna unit comprising a radiator and a transmission line connected to the radiator;

a dummy electrode separated from the antenna unit on the top surface of the dielectric layer, the dummy electrode at least partially surrounding the antenna unit; and a blocking pattern arranged around the antenna unit in the dummy electrode, wherein the blocking pattern has an island shape separated in the dummy electrode.

2. The antenna device of claim 1, wherein each of the antenna unit and the dummy electrode includes a mesh structure.

3. The antenna device of claim 2, wherein the blocking pattern includes a mesh structure the same as the mesh structure included in the dummy electrode.

4. The antenna device of claim 1, wherein the blocking pattern comprises a plurality of blocking patterns arranged along a perimeter of the antenna unit.

5. The antenna device of claim 1, wherein the radiator comprises a plurality of radiators arranged on the top surface of the dielectric layer.

6. The antenna device of claim 5, further comprising a pad electrode independently provided for each of the plurality of radiators.

7. The antenna device of claim 5, wherein the plurality of radiators comprise a first radiator and a second radiator adjacent to each other; and the first radiator and the second radiator are coupled by the transmission line to form a radiator group.

8. The antenna device of claim 7, wherein the blocking pattern is disposed between the first radiator and the second radiator.

9. The antenna device of claim 7, wherein the radiator group comprises a plurality of radiator groups arranged on the top surface of the dielectric layer.

10. The antenna device of claim 9, further comprising a pad electrode independently provided for each of the plurality of radiator groups.

11. The antenna device of claim 1, further comprising a ground layer disposed on a bottom surface of the dielectric layer.

12. The antenna device of claim 1, wherein a ratio of an area of the blocking pattern relative to an area of the radiator is from 0.4 to 0.85.

13. The antenna device of claim 1, wherein a spacing distance between the radiator and the dummy electrode is from 2 to 10 μm.

14. The antenna device of claim 1, wherein the antenna unit, the dummy electrode and the blocking pattern include at least one selected from the group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) and an alloy thereof.

15. A display device comprising the antenna device of claim 1.

* * * * *